Feb. 1, 1927.

J. C. TUTTLE ET AL 1,616,069

TIRE CONSTRUCTION

Original Filed March 2, 1920

Inventors.
John C. Tuttle
John P. Smith
Martin L. Wiener
by G. L. Ely Atty.

Patented Feb. 1, 1927.

1,616,069

UNITED STATES PATENT OFFICE.

JOHN C. TUTTLE, JOHN P. SMITH, AND MARTIN L. WIENER, OF AKRON, OHIO, ASSIGNORS TO THE FIRESTONE TIRE AND RUBBER COMPANY, OF AKRON, OHIO, A CORPORATION OF OHIO.

TIRE CONSTRUCTION.

Application filed March 2, 1920, Serial No. 362,686. Renewed July 25, 1924.

In the construction of tire casings for pneumatic tires it is customary to build up the carcass or foundation of the tire of a plurality of layers or plies of rubberized fabric, the number of layers depending upon the size of the tire. The number of plies is usually determined by the cross section, it being the general practice to provide four plies in a tire of three or three and one-half inch cross section and to add a ply for each half inch cross section. Thus a four inch tire has five plies, a four and one-half inch tire six plies, and so on. These plies may be of woven fabric, such as canvas or duck. On the outer surface of the carcass built up from layers of fabric is superposed a cushion strip of rubber, a breaker strip and the rubber tread. The whole structure so formed is then vulcanized.

Heretofore, it has been the universal custom to use the same weight of fabric in all the plies and to rubberize, or coat and impregnate with rubber, to equal thickness in all the plies. We have found that by increasing the proportion of rubber contained in the plies, outwardly toward the tread of the tire, remarkable results have been obtained in wearing qualities. It has also been found that if the outer ply, or plies, are made of more loosely woven fabric than the inner plies,—which increase the proportion of rubber—longer life is insured for the tire.

While the description of the specific method of carrying out the invention is quite detailed, it will be understood that when the principles have been outlined, it is possible to embody the same invention here disclosed and claimed in other forms and such forms are intended to be covered hereby.

Figure 1:
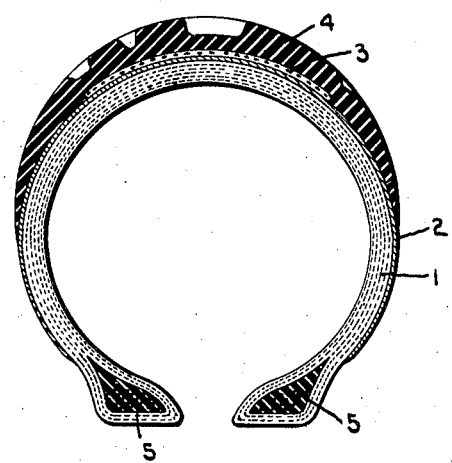
Fig. 1 is a cross-section of a tire, which for the sake of definiteness will be understood to be a four and one-half inch tire.
Figure 3:
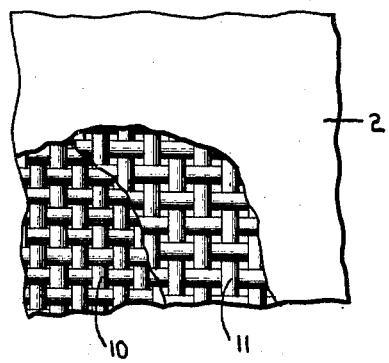
Fig. 3 is a plan of a portion of the tire, also enlarged, showing a portion of the cushion removed.

The tire section, as shown, comprises the usual carcass designated generally by the numeral 1, the cushion 2, breaker 3, and tread 4. In the lower inner edges of the tire are embedded the usual beads 5, in the form shown as straight-side beads, but may be clincher or any other construction.

Figure 2:
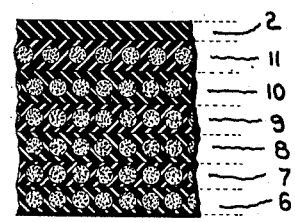
Fig. 2 is a very greatly enlarged cross section of a small portion of a tire.

The carcass is composed of a plurality of layers of fabric impregnated and coated with rubber, this work being done in the usual calendering apparatus. The fabric may be either square woven fabric, such as shown in the drawings, cord fabric as is used in the manufacture of cord tires, the cords being spaced in the tire in the manner illustrated in Figure 2, or any other type of fabric.

In the specific example which we have chosen to illustrate, a carcass is shown comprising six layers, the first five layers being composed of closely woven fabric and the last or top layer of more loosely woven fabric, and it will be noted that the layers increase in thickness as they approach the tread of the tire, which increase is due to a heavier calendering or coating of the fabric with rubber, but that the last ply of loosely woven fabric, while of the same thickness as the one immediately below it, contains a larger proportion of rubber.

For the sake of clearness, the first five layers of closely woven fabric are designated 6 to 10 inclusive, and the outer layer as 11.

While we do not wish to be confined to any dimensions, such as now are to be given in detail, such proportions and gauges have been tried and found to give excellent results.

Plies numbered 6 to 10 inclusive may be made from the standard 17¼ oz. duck at present in use, while ply numbered 11 may be made of 12 oz. duck, which, while of the same thickness, is more loosely woven, permitting a greater amount of rubber to be contained therein. The first and second plies—6 and 7—may be calendered to a gauge of .040 inch, the third and fourth—8 and 9—to a gauge of .045, and the fifth to gauge of .050. The sixth and last ply may also be calendered to a gauge of .050, but due to the loose weave, a greater proportion of rubber is carried in that ply than in any of the preceding plies.

The cushion layer may be of any desired gauge, it being possible to reduce the thickness of the cushion from that of former tire construction without loss of efficiency to the tire.

We are unable at the present time to give any adequate or extended information as to the reasons for the improved wearing qualities obtained by tires of this peculiar construction, but experience has shown that superior results are obtained.

Having fully described the invention, it will be understood that changes and modifications may be made within the scope of the claims without departing therefrom or sacrificing any of its benefits. Nor is our invention confined to the use of woven fabric, as other fabrics may be used in place thereof. Such constructions embody the principles of this invention and are intended to be covered hereby.

We claim:

1. A tire construction comprising a carcass formed of a plurality of layers of fabric coated and impregnated with rubber, the thickness of said layers of fabric and rubber increasing outwardly towards the tread of the tire, several of the layers being of closely woven fabric and an outer layer of more loosely woven fabric, whereby the amount of rubber within the several layers is of increased thickness outwardly of the tire.

2. A tire construction comprising a carcass formed of a plurality of layers of textile elements coated and impregnated with rubber, the thickness of said layers increasing outwardly toward the tread of the tire, the elements of an outer layer being spaced greater distances apart than those in the inner layers whereby there will be a greater amount of rubber in the outer regions of the carcass than in the inner regions thereof.

3. A tire construction comprising a carcass formed of a plurality of layers of textile elements coated and impregnated with rubber, the outer layers of said elements adjacent the tread being provided with thicker coatings of rubber than the inner layers thereof and the elements of an outer layer being spaced greater distances apart than the elements of the inner layers whereby there is a greater proportion of rubber in the outer regions of the carcass adjacent the tread than there is in the inner regions thereof.

JOHN C. TUTTLE.
JOHN P. SMITH.
MARTIN L. WIENER.